United States Patent [19] [11] 4,374,336
Shimizu [45] Feb. 15, 1983

[54] FLAT MOTOR

[75] Inventor: Tokuo Shimizu, Fuchu, Japan

[73] Assignee: Olympus Optical Co., Ltd., Tokyo, Japan

[21] Appl. No.: 268,091

[22] Filed: May 27, 1981

[30] Foreign Application Priority Data

Jun. 3, 1980 [JP] Japan .................................. 55-74510
Jun. 3, 1980 [JP] Japan .................................. 55-74511

[51] Int. Cl.³ ........................................... H02K 21/26
[52] U.S. Cl. .............................. 310/154; 310/40 MM; 310/71; 310/194; 310/268
[58] Field of Search ................. 310/268, 71, 165, 154, 310/208, 40 MM, 43, 194, 45, 234, 198, 203, 206

[56] References Cited

U.S. PATENT DOCUMENTS 3,512,025 5/1970 Quellet ................................ 310/208
3,845,339 10/1974 Merkle et al. ...................... 310/268
4,164,675 8/1979 Sato et al. .......................... 310/268
4,203,048 5/1980 Sato ..................................... 310/268
4,303,844 12/1981 Suzuki ................................ 310/268

Primary Examiner—R. Skudy
Attorney, Agent, or Firm—Frishauf, Holtz, Goodman & Woodward

[57] ABSTRACT

A flat motor comprises a rotor including a shaft and a plurality of coils arranged concentric with the shaft and each said coil being constituted by a winding having a predetermined diameter, the position of the end of the winding being set at a predetermined distance from the shaft, a magnet having a doughnut-like form with the inner periphery thereof spaced apart from the shaft by a distance smaller than said predetermined distance, and a connector plate provided on the rotor and extending between the rotor and magnet, having a thickness at least smaller than the predetermined diameter of the coil winding. The end of the winding of each coil is electrically connected to the connector plate.

6 Claims, 9 Drawing Figures

FLAT MOTOR

BACKGROUND OF THE INVENTION

This invention relates to flat motors and, more particularly, to flat motors suited for use with miniaturized cassette tape recorders.

In the recent cassette tape recorder, the size reduction of the motor used has been called for in order to reduce the size of the system, and flat motors have been extensively used to meet this demand.

The usual flat motor has a construction as schematically shown in FIG. 1, having a rotor 14 rotatably supported in a housing by a shaft 12. The rotor 14 is provided with coils 18 each wound on a bobbin 16, and a magnet 20 is provided in the housing 10 to face the coils 18.

With such a construction, for enhancing the freedom of control it has been thought to minimize the gap A formed between the rotor 14 and magnet 20 or between the rotor 14 and housing 10 so as to make effective use of the magnetic field set up by the magnetic circuit. To this end, a construction where an end of the winding of each coil 18 is not found in the gap A is adopted. While the diameter of a copper wire constituting the coil 18 is around 0.2 mm, the overall winding diameter inclusive of the thicknesses of the insulation layer and self-fusion layer covering the wire, is about 0.3 mm. Therefore, in case if the end of the winding of the coil 18 is found in the aforementioned gap A, the dimension thereof has to be greater than 0.3 mm which is the diameter of the winding. With such the gap the magnetic flux density is too low to be able to permit effective use of the magnetic field, and the control property is also inferior.

Accordingly, the position of the end of the winding of the coil 18 is set to be on the inner side of the inner periphery of the magnet 20. With this construction, the end of the winding of the coil 18 is not found in the aforementioned gap A, so that it is possible to reduce the gap A to a mechanically permissible value.

However, it is intended to reduce the outer diameter of the housing 10 for reducing the size of the motor without sacrifice in the performance as shown in FIG. 2, it dictates setting the position of the winding end to be close to the shaft 12 without altering the size of the magnet 20. In this case, it is inevitable from the aforementioned positional relation between the magnet 20 and coil 18 that the radial coil size B is reduced by an amount corresponding to the extent of change of the winding end setting position. Therefore, the number of coil turns is reduced to reduce the torque, so that the performance comparable to that of the conventional motor cannot be obtained.

SUMMARY OF THE INVENTION

The invention is intended in the light of the above mentioned circumstances, and its object is to provide a flat motor, which permits size reduction and improvement of performance.

According to an aspect of the present invention, there is provided a flat motor which comprises a rotor including a shaft and a plurality of coils arranged concentric with said shaft and each coil being comprised of a winding having a predetermined diameter, the position of the end of each aforementioned winding being set at a predetermined distance from the shaft, a magnet having a generally doughnut-like form with the inner periphery thereof spaced apart from the shaft by a distance smaller than the aforementioned predetermined distance, and a connector plate provided on the rotor and extending between the rotor and magnet, the end of the winding of each coil being electrically connected to the connector plate, the connector plate having a thickness at least smaller than the aforementioned predetermined diameter of each coil winding.

DETAILED DESCRIPTION OF THE PREFERRED EMBODIMENTS

Now, one embodiment of the flat motor according to the invention will be described with reference to FIGS. 3 to 6.

Figure 1:
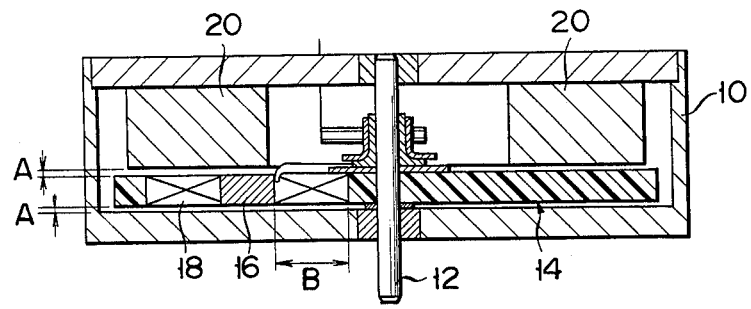
FIGS. 1 and 2 are sectional views showing respective prior art flat motors.
Figure 2:
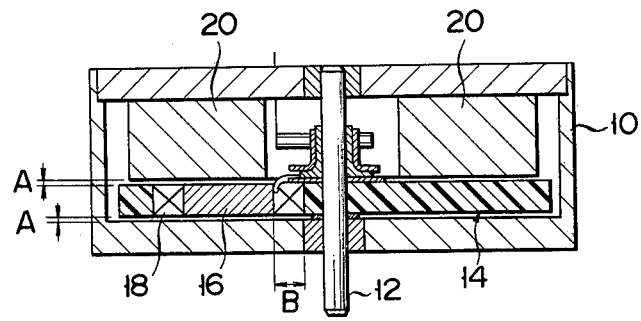
Figure 3:
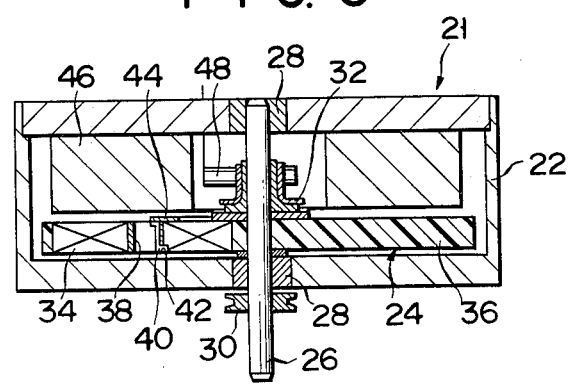
FIG. 3 is a sectional view showing one embodiment of a flat motor according to the invention.
Figure 4:
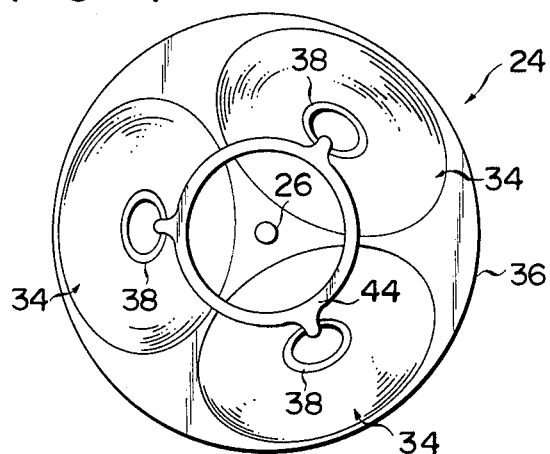
FIG. 4 is a top view of the rotor shown in FIG. 3.

Designated at 21 in FIG. 3 is the flat motor, which has a cylindrical housing 22 made of a magnetic material and closed at the top and bottom. A rotor 24 is rotatably accommodated in the housing 22. The rotor 24 includes a coaxial and integral shaft 26. The shaft 26 is aligned to the axis of the housing 22, and is journalled therein by means of a pair of bearings 28. The shaft 26 has one end portion projecting from the housing 22, and a pulley 30, via which the torque of the motor 21 is taken out to the outside, is secured to the projecting shaft end portion. Secured to the other end portion of the shaft 26 extending in the housing 22 is a commutator 32 consisting of six divisions arranged side by side in the circumferential direction.

The rotor 24 includes three, uniformly spaced-apart coils 34 and at the same distance from the shaft 26. The rotor 24 is a disc-like molding of a synthetic resin 36 integrally inclusive of the shaft 26 and coils 34. Each coil 34 is comprised of a hollow cylinder 38 and a winding 40 wound on the hollow cylinder 38. The cylinder 38 is formed with a through hole 42, through which one end portion of the winding 40 is passed and led into the inside of the cylinder 38.

Figure 5:
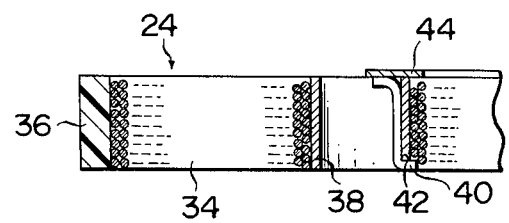
FIG. 5 is a fragmentary enlarged-scale sectional view of the rotor shown in FIG. 3.

A connector plate 44 is provided on the rotor 24. The connector plate 44 is made of an electrically conductive material and is a generally doughnut-like or ring-like form having a thickness sufficiently smaller than the diameter of the winding 40. The connector plate 44 has peripheral outer projections each extending to face the opening of the cylinder 38 of the coil 34. As shown in FIG. 5, the one end of the winding 40 of each coil 34 is electrically connected to the projection of the connector plate 44.

As shown in FIG. 3, a magnet 46 of a generally doughnut-like form is provided within the housing 22 such as to face the coils 34 of the rotor 24. The magnet 46 has an internal opening (center of the doughnut shape) and an inner periphery surround the internal opening. The hollow cylinder 38 is positioned farther from the shaft 26 than the inner periphery of the doughnut-like shaped magnet 46.

Figure 6:
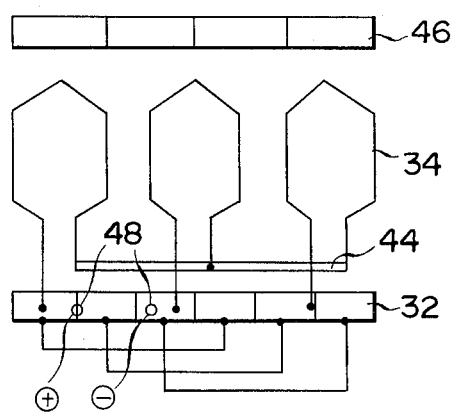
FIG. 6 is a schematic view showing the wiring of the flat motor shown in FIG. 3.

Of the commutator divisions, two adjacent but one to each other are in contact with respective paired brushes 48 which are also provided within the housing 22. The pair brushes 48 are connected to respective terminals of positive and negative poles. FIG. 6 shows the state of electrical connection of the coils 34, connector plate 44, commutator divisions 32 and brushes 48. As is seen from FIG. 6, the end of the winding of each coil 34 is connected to every but one commutator division 32.

In other words, in the flat motor 21 having the above construction, the end of the winding 40 of each coil 34 is electrically connected to the thin connector plate 44. The thickness of the connector plate 44 is set to be sufficiently smaller than the diameter of the winding 40 of the coil 34. Thus, it is possible to insert the connector plate 44 in the gap between the coil 34 and magnet 46 without need of increasing the gap in comparison with the prior art flat motor, that is, without reduction of the flux density with increase of the gap.

Further, since the connector plate 44 can be located in the aforementioned gap, the end of the winding 40 of the coil 34 may be set not on the inner side of the inner periphery of the magnet 20 but on the outer side of the magnet inner periphery. This means that even if the diameter of the inner periphery of the magnet 46 is reduced for reducing the outer diameter of the flat motor 21, for position of the end of the winding 40 of the coil 34 is not influenced by the change of dimensions of the magnet 26 at all. In other words, unlike the prior art case the reduction of the diameter of the magnet 46 will not dictate the reduction of the number of turns of the coil 34. Thus, the desired number of turns of the coil 34 can be secured so that required torque can be provided without reduction. Further, it is possible to increase torque since the number of turns of the coil 34 can be increased compared to the prior art case.

The above embodiment of the invention is given for the purpose of illustrating the invention, and various changes and modifications are possible without departing from the scope of the invention. Another embodiment of the invention will now be described with reference to FIGS. 7 to 9. Like and same parts are designated by like and same reference numerals, and their descriptions are omitted.

Figure 7:
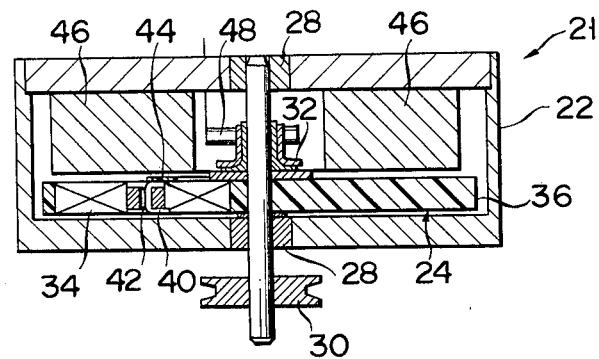
FIG. 7 is a sectional view showing another embodiment of the flat motor according to the invention.
Figure 8:
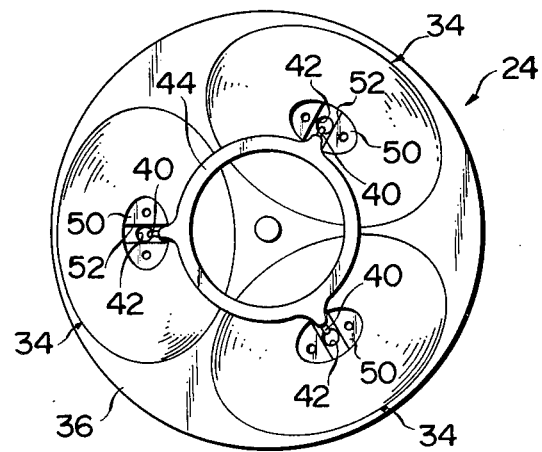
FIG. 8 is a top view of the rotor shown in FIG. 7.

As shown in FIG. 7, each coil 34 is comprised of a bobbin 50 and a winding 40 wound on the outer periphery of the bobbin 50. The bobbin 50 is oval in plan view, and its top and bottom are provided with respective grooves 52 which are communicated with each other by a through hole 42 extending in the thickness direction of the bobbin. The end of the winding 40 can be passed through the hole 42. The end of the winding 40 is led along one of the grooves 52 and through the hole 42 of the bobbin 50 to the other groove 52.

Figure 9:
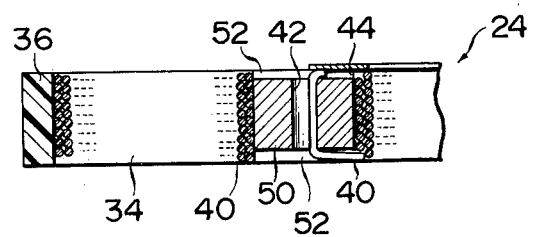
FIG. 9 is a fragmentary enlarged-scale sectional view of the rotor shown in FIG. 7.

A connector plate 44 is provided on the rotor 24. The connector plate 44 is made of an electrically conductive material and has a doughnut-like shape with the thickness thereof sufficiently smaller than the diameter of the winding 40, and it has projections extending to face the holes 42 of the bobbins 50 of the coils 34. As shown in FIG. 9, the end of the winding 40 of each coil 34 is electrically connected, for instance by spot welding, to the projection of the connector plate 44.

With this embodiment, in which the bobbin 50 on which the winding 40 of the coil 34 is wound is provided with the through axial hole 42 and top and bottom grooves 52 communicating therewith, the end of the winding 40 of the coil 34 can be reliably led to the outside without need of increasing the thickness of the rotor 24. Thus, the same effects as those of the preceding embodiment can also be obtained with this embodiment.

While in both previous embodiments the connector plate 44 has been made of an electrically conductive material, i.e., a metal, if the connector plate 44 is made of a material which also has the ferromagnetic character, it will experience an electromagnetic force of attraction, which tends to bias the rotor 24 in one direction. This will have an effect of peventing the vibrations of the motor 24 during the rotation thereof, that is, a function of preventing the vibrations of the rotor 24 can be obtained. As the material in this case, i.e., the material having both electric conductivity and ferromagnetic character, any Group VIII metal element, for instance Fe, Co and Ni, or any alloy of these metals, and preferably a material which is capable of being readily formed into a thin plate, may be selected. Further, since the magnitude of the magnetic force of attraction is determined by the actual area that crosses the flux of the magnet 46, the control of the aforementioned force can be obtained through the control of this area.

What is claimed is:

1. A flat motor comprising:
   a rotor including a shaft and a plurality of coils arranged concentric with said shaft, each of said coils comprising a winding having a predetermined diameter and an end, the position of the end of said winding being set at a predetermined distance from said shaft;
   a magnet having an internal opening and an inner periphery surrounding said internal opening, said inner periphery of said magnet being spaced apart from said shaft by a distance smaller than said predetermined distance; and
   a ring-like connector plate provided on said rotor and extending between said rotor and said magnet, the end of the winding of each said coil being electrically connected to said connector plate, said connector plate having a thickness at least smaller than said predetermined diameter of said winding of each said coil.

2. The flat motor according to claim 1, wherein each said coil includes a cylinder and the winding wound on the cylinder, each cylinder having a small wall thickness and formed with a peripheral through hole, the end of the winding of the respective coil being led through said hole into the interior of said cylinder.

3. The flat motor according to claim 2, wherein said connector plate has outward projections extending to face said respective cylinders, the end of the winding of each said coil being electrically connected to each said projection of said connector plate.

4. The flat motor according to claim 1, wherein each said coil includes a bobbin and the winding wound on the outer periphery of the bobbin, said bobbin being formed with a central axial through hole and grooves formed on the opposite side faces and communicating with said hole, the end of said winding being led along one of said grooves and then through said hole to the other groove.

5. The flat motor according to claim 4, wherein said connector plate has outward projections extending to face the outer periphery of said bobbins, the end of the winding of each said coil being electrically connected to each said projection of said connector plate.

6. The flat motor according to any one of claims 1, 2, 3, 4 or 5, wherein said magnet has a generally doughnut-like form, said internal opening being the internal open portion of said doughnut-like form.

* * * * *